(12) United States Patent
Kalisz et al.

(10) Patent No.: US 10,474,746 B2
(45) Date of Patent: Nov. 12, 2019

(54) FLEXIBLE AND INTUITIVE TABLE BASED VISUALIZATIONS FOR BIG DATA

(71) Applicant: SAP SE, Walldorf (DE)

(72) Inventors: Karol Kalisz, Sandhausen (DE); Reiner Hille-Doering, Karlsruhe (DE)

(73) Assignee: SAP SE, Walldorf (DE)

( * ) Notice: Subject to any disclaimer, the term of this patent is extended or adjusted under 35 U.S.C. 154(b) by 852 days.

(21) Appl. No.: 14/951,036

(22) Filed: Nov. 24, 2015

(65) Prior Publication Data

US 2017/0147551 A1    May 25, 2017

(51) Int. Cl.
*G06F 16/28* (2019.01)
*G06F 16/248* (2019.01)
*G06F 17/24* (2006.01)

(52) U.S. Cl.
CPC .......... *G06F 17/245* (2013.01); *G06F 16/248* (2019.01); *G06F 16/283* (2019.01)

(58) Field of Classification Search
CPC ............ G06F 17/245; G06F 17/30554; G06F 17/30592
See application file for complete search history.

(56) References Cited

U.S. PATENT DOCUMENTS

| | | | | |
|---|---|---|---|---|
| 7,302,447 B2* | 11/2007 | Dettinger | ............ | G06F 16/2452 707/714 |
| 7,526,719 B1* | 4/2009 | Gopalakrishnan | ...... | G06F 16/26 715/227 |
| 7,933,862 B2* | 4/2011 | Chamberlain | ........ | G06F 17/246 707/602 |
| 8,793,567 B2* | 7/2014 | Velingkar | ............... | G06F 16/20 715/220 |
| 8,812,947 B1* | 8/2014 | Maoz | .................... | G06F 17/246 715/212 |
| 8,935,249 B2* | 1/2015 | Traub | .................. | G06F 16/3331 707/737 |
| 2002/0070953 A1* | 6/2002 | Barg | ....................... | G06Q 10/10 715/700 |
| 2007/0079251 A1* | 4/2007 | Peterkofsky | .......... | G06F 3/0481 715/781 |
| 2009/0106653 A1* | 4/2009 | Lee | ........................ | G06F 17/211 715/273 |
| 2010/0070491 A1* | 3/2010 | Cragun | ................... | G06F 16/00 707/722 |
| 2010/0161593 A1* | 6/2010 | Paulsen | ................. | G06F 3/0481 707/722 |
| 2016/0350950 A1* | 12/2016 | Ritchie | ................ | G06T 11/206 |

* cited by examiner

*Primary Examiner* — Scott T Baderman
*Assistant Examiner* — Mario M Velez-Lopez
(74) *Attorney, Agent, or Firm* — Buckley, Maschoff & Talwalkar LLC

(57) ABSTRACT

A method, system, and computer-readable medium to define a row scope for a table-based visualization of the multidimensional data set, the row scope specifying a number of dimensions of the multidimensional data set; selectively define at least one data selection of the multidimensional data set to connect to the defined row scope to be visualized in the table-based visualization; and generate an instance of the table-based visualization based on the defined row scope and the defined at least one data selection.

18 Claims, 16 Drawing Sheets

| Customer | Country | Region | Sum of Sales Value per/Field/Period | |
|---|---|---|---|---|
| 1 | AUS\|Australia | NRD\|AUS/NRD | 56.05 | |
| 10 | AUS\|Australia | NRD\|AUS/NRD | 112.1 | ⇨ |
| 13 | AUS\|Australia | NRD\|AUS/NRD | City     Revenue<br>Canberra    32<br>Melbourn    45,85<br>Geelong    23,6<br>Adelaide    10,65<br>Sum        112,1 | ⇩ |
| 20 | AUS\|Australia | NRD\|AUS/NRD | 224.2 | ⇨ |
| 23 | AUS\|Australia | NRD\|AUS/NRD | 168.15 | ⇨ |

200

```
┌─────────────────────────────────────────────────────────────┐
│ DEFINE A ROW SCOPE FOR A TABLE-BASED VISUALIZATION OF A     │
│ MULTIDIMENSIONAL DATA SET, THE ROW SCOPE SPECIFYING A       │
│ NUMBER OF DIMENSIONS OF THE MULTIDIMENSIONAL DATA SET       │
│                                                         205 │
└─────────────────────────────────────────────────────────────┘
```

```
┌─────────────────────────────────────────────────────────────┐
│ SELECTIVELY DEFINE AT LEAST ONE DATA SELECTION OF THE       │
│ MULTIDIMENSIONAL DATA SET TO CONNECT TO THE DEFINED ROW     │
│ SCOPE TO BE VISUALIZED IN THE TABLE-BASED VISUALIZATION     │
│                                                         210 │
└─────────────────────────────────────────────────────────────┘
```

```
┌─────────────────────────────────────────────────────────────┐
│                                                             │
│ GENERATE AN INSTANCE OF THE TABLE-BASED VISUALIZATION       │
│ BASED ON THE DEFINED ROW SCOPE AND THE DEFINED AT LEAST     │
│                    ONE DATA SELECTION                       │
│                                                             │
│                                                         215 │
└─────────────────────────────────────────────────────────────┘
```

```
1400
{
    'YEAR_QUARTER':'201403',                              ········ Selection Opening 1405
                                                          ········ Dimension 1 selection 1410
    '(MEASURES_DIMENSION)':'BILLED_QUANTITY',             ········ Measure selection 1415
    'CUSTOMER':'(RESULT_MEMBER)'                          ········ Dimension 2 selection 1420
    /value                                                ········ Content Type 1425
}                                                         ········ Selection Closing 1430
```

*FIG. 14*

```
1500
{
    /dimensions                                           ········ Selection Opening 1505
    /(MEASURES_DIMENSION)                                 ········ from dimensions 1510
                                                          ········ and measure dimension 1515
    /members                                              ········ and measures 1520
    /BILLED_QUANTITY                                      ········ selected measure 1525
    /unitOfMeasure                                        ········ metadata content 1530
}                                                         ········ Selection Closing 1535
```

*FIG. 15*

```
{
    'YEAR_QUARTER':(RESULT_MEMBER),     ······ Selection Opening 1605
                                        ······ Dimension 1 selection, 1610
    '(MEASURES_DIMENSION)':'SALES_VALUE', ······ Measure selection 1615
    'CUSTOMER':'?'                      ······ Dimension with all members 1620
}                                       ······ Selection Closing 1625
```

FLEXIBLE AND INTUITIVE TABLE BASED VISUALIZATIONS FOR BIG DATA

Some business computing systems, applications, and services manage, store, and perform queries on vast amounts of data (i.e., "big data"). In some instances, a user may want to view the query results of various data sets on a display device in compressed form in order to make a business or other types of decisions based on the query results. However, in some such instances, a user may be faced with the task of repeatedly having to scroll through large raw data tables that need to be formatted to display on multiple sheets and screens.

BRIEF DESCRIPTION OF THE DRAWINGS

FIG. 2 is a flow diagram of a process, according to some embodiments;

FIG. 4 is an illustrative depiction of a table-based visualization including a comparison chart visualization in a cell, in accordance with some embodiments herein;

FIG. 6 is an illustrative depiction of a selection process to define a row scope and content selection for a table-based visualization, in accordance with some embodiments herein;

FIG. 7 is an illustrative depiction of a selection process to define a row scope and content selection for a table-based visualization including bar charts, in accordance with some embodiments herein;

FIG. 10 is an illustrative depiction of a selection process to specify a row scope with a filter, in accordance with some embodiments herein;

FIG. 11 is an illustrative depiction of a selection process to specify a row scope with a filter, in accordance with some embodiments herein;

FIG. 14 is an illustrative depiction of an exemplary selection, in accordance with some embodiments herein;

FIG. 15 is an illustrative depiction of an exemplary selection, in accordance with some embodiments herein;

FIG. 16 is another illustrative depiction of an exemplary selection, in accordance with some embodiments herein.

DETAILED DESCRIPTION

Figure 1:
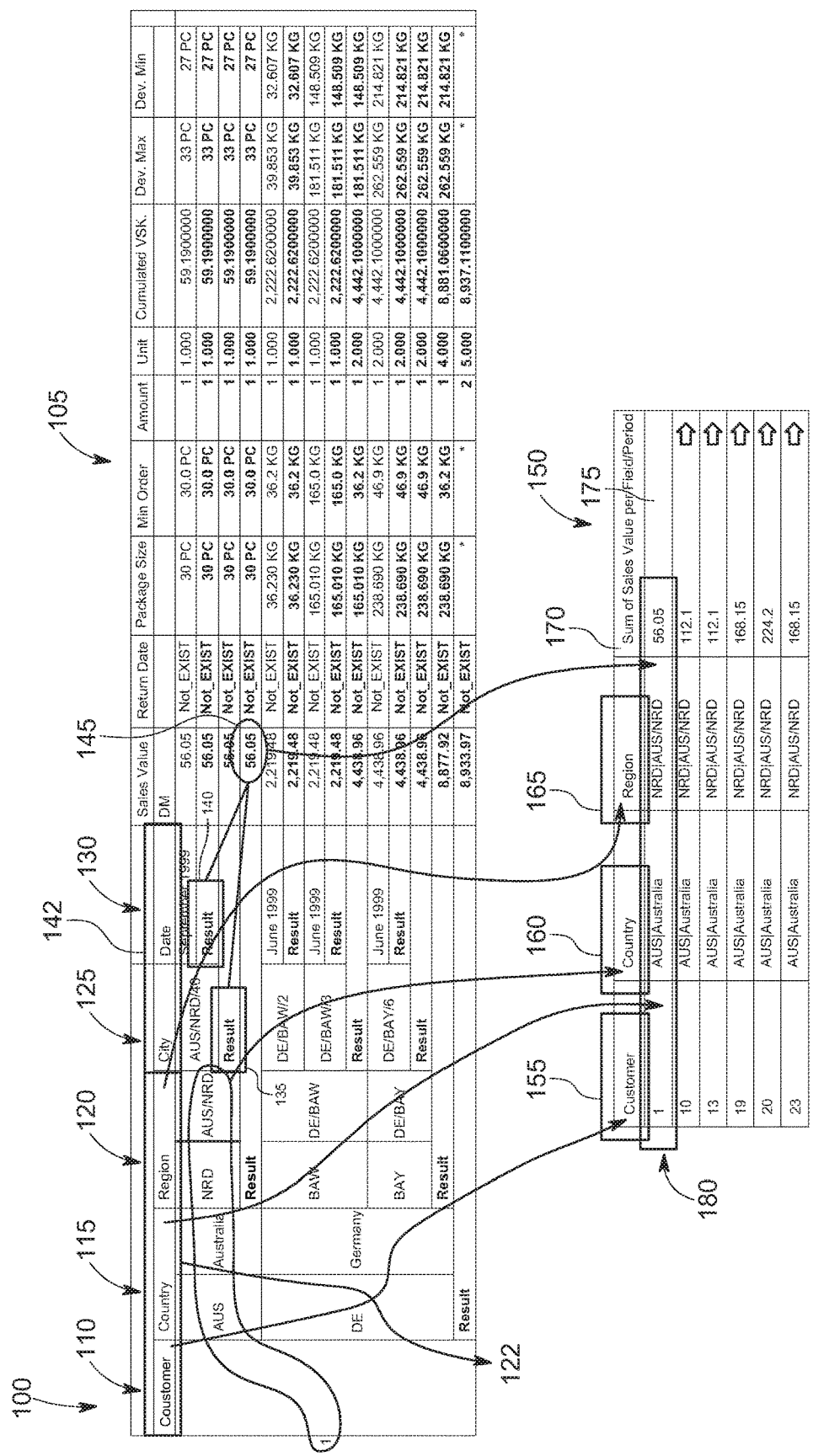
FIG. 1 is an illustrative depiction of a selection model to define a row scope and content selection for a table-based visualization, in accordance with some embodiments herein.

Some embodiments herein are associated with methods and systems for defining and generating visualizations of multidimensional data sets where the multidimensional data can be concisely visualized in a customizable table-based visualization including a variety of data content visualizations. Multidimensional data (e.g., business data) may be logically organized as a cube. The cube can be a multidimensional generalization of two, three, or an arbitrary number of dimensions. As an example, a company may summarize financial data by product, time period, region, and city, where product, time, region, city and a scenario (actual and budget) are the data's dimensions. Each cell of the cube may contain a number that represents some measure of the business (e.g., sales, profits, expenses, budget, forecast, etc.). Multidimensional data for a business may be stored in a data warehouse and/or other data management systems. Measures can be derived from data warehouse records in the fact tables and dimensions can be derived from the dimension tables.

The display and navigation of a display of multidimensional business data in the form of cubes and queries may be difficult to effectively execute since a user display device is typically only two-dimensional. Moreover, a typical view for such data is a table view. In some aspects, the present disclosure relates to defining and generating table-based visualizations of multidimensional data sets. However, in general, the processes and systems disclosed herein may be applied to other types of visualization (i.e., non table-based) controls as well.

In some aspects, a table-based visualization of multidimensional data may be addressed by a flexible definition of table cell content. In a typical data table, a standard cell contains a single value described by the cross point of a row and a column (e.g., a dimension and a measure in business data terms).

In some embodiments, a table-based visualization (also referred to herein simply as a "visualization") may comprise rows and columns. The table-based visualization may be used, in some contexts, to add a visualization analytic component to an analysis (or other) application to allow users thereof to view multidimensional data as a highly customizable table that may include a variety of charts and other representations of data content in columns. In some embodiments, as determined based on the table-based visualization's column properties, each column can display information in the form of text, images, charts, graphs, and other custom (i.e., hybrid) representations. Each column property may be bound or connected to a selection of an associated multidimensional data source.

As used herein, a multidimensional data set may be a well-defined and organized collection of data persisted in a data warehouse or other data management system. As such, the collection, organization, and storage of a multidimensional data set that may be used as a data source for the visualization processes herein can be performed by a variety of techniques, processes, and systems without limit or loss of generality. In some embodiments, the processes and systems herein may use multidimensional data provided by or obtained from other processes and systems, the details of which may be mentioned herein only to the extent necessary to understand the present disclosure.

In some embodiments, multi-dimensional data can be visualized in a crosstable, as generally shown in FIG. 1 at 100. Crosstable 100 has two axes—an axis of rows and an axis of columns. Each of the axes can contain one or more dimensions and their their members. In crosstable 100, the columns axis contains the measures and the rows axis contains the dimensions of Customer, Country, Region, City, and Date.

Herein, each dimension can include (at least) a name and may have a key (not visible in the example of FIG. 1). Also, the members of a dimension have a name and a key. For example, the dimension "Country" shown at column 160 contains members that are the names of different countries (e.g., Australia with key "AUS", Germany with key "DE", etc.). In some embodiments, a dimension can include actual members corresponding to data taken directly from a data source (e.g., data source table 105) and can also include a "pseudo member" representing an aggregated (or other calculated or derived) value such as, for example, a "Totals" or a "Result" value. The crossing points or intersection between members on the axes contains the actual data. Depending which dimensions are on the rows axis or the columns axis, there is some total number of combinations between the dimensions. Also, whether a dimension is assigned to rows or columns will determine how the data can be mapped to a table representation of the data.

In some embodiments, a process to configure a table-based visualization may be executed using one or more applications, systems, or services having functionality to perform the operations as disclosed below. A process to configure a table-based visualization may broadly include defining a row scope for the desired table-based visualization and generating the visualization. FIG. 1 is an illustrative depiction of a selection model or process to define a row scope and content selection for a table-based visualization, in accordance with some embodiments herein.

A subset of a multi-dimensional data set can be selected by a data selection model or process using a data selection expression. In some embodiments, a data selection expression herein may contain one or more pairs of dimension and member keys. In some aspects, only data cells belonging to given members stated in a particular data selection expression are included (i.e., selected). While data selection is introduced now and used throughout the following disclosure, explicit examples of valid data selection expressions are depicted in FIGS. 14, 15, and 16. In some embodiments, to create a table-based visualization the multidimensional data source contains some dimensions in rows. At least one of those dimensions can be used for a Row Scope definition. In some aspects, for a best fit the measures are configured in columns. It is noted that in some embodiments the measures may be placed in rows, wherein the role of measures will change and will be handled as normal members of measure dimension.

FIG. 1 shows a depiction of a selection model 100 including a portion of a multidimensional data set represented by table 105 where the data is arranged in rows (dimensions) and columns (measures). At least one of the five dimensions 110, 115, 120, 125, and 130 of table 105 may be selected to define the "Row Scope" of the desired table-based visualization. In some embodiments, a first, second or any other dimension can be selected for the rows. A row in table-based visualization will have the scope of the selected dimensions from table 105. In the example of FIG. 1, dimensions 110 ("Customer"), 115 ("Country"), and 120 ("Region") are selected as shown by box 122.

In some embodiments, every row will become a single member selection of the chosen dimension and all dimensions that are placed higher in the rows. The other dimensions that are not contained in the "Row Scope" definition (e.g., dimensions 125 ("City") and 130 ("Date") in FIG. 1) are available for any use in the row (e.g., for charts).

FIG. 1 further includes an illustrative representation of a table-based visualization 150. As demonstrated by the lines from table 105 to visualization 150, the selected dimensions 110 ("Customer"), 115 ("Country"), and 120 (Region) are combined to form rows in visualization 150. Rows in visualization 150 include a combination of a customer 155, a country 160, and a region 165, as shown in header 147. Each row in table-based visualization 150 is a combination (i.e., multiplication) of the three members—customer 155, country 160, and region 165. Results of corresponding dimensions (i.e. sums) are handled as standard members and are participating in the rows' creation process.

In some embodiments, the number of dimensions specified in a Row Scope is a sub-set of the total number of dimensions available in the multidimensional data set. In the example of FIG. 1, a maximum number of dimensions for a Row Scope can be five (there are 6 dimensions, but one is containing measures=5). Thus, the Row Scope in the example of FIG. 1 can be 1, 2, 3, 4, or 5, even though it is 3 for the present example.

By selecting customer 110, country 115, and a region 120 for the row scope in FIG. 1, each row in visualization 150 will be assigned a concrete combination of the customer, country, and region members of the dimensions of the multidimensional data set represented in table 105. Other row scopes of different combinations of dimensions will result in visualizations having rows of corresponding different members. For example, a Row Scope defined by a selection of dimension 110 only will result in a visualization table having rows where each row is assigned to a concrete customer as the member of the dimension Customer.

Referring to FIG. 1, the two dimensions not selected in the Row Scope definition operation are available for selection and use in other columns of visualization table 150 rows to express, for example, details related to the Row Scope. The details may be selectively represented in a variety of graphs, charts, images, and other visualization presentations. In the example of FIG. 1, the dimensions 125 and 130 are selected for representation in column 170, as shown by box 142. As shown, the "Result" 135 and 140 of table 105 from the selected dimensions 125 and 130 in addition with the measure "Sales Value" are used to determine the data content of the measure "Sales Value" in cell 175 of visualization table 150 for the particular combination of customer (i.e., "1"), country (i.e., "Australia"), and region (i.e., "AUD/RND") in row 180 in table 150. Accordingly, the value of "56.05" is shown in cell 175 that corresponds to the selected combination of parameters of table 105. In the example of FIG. 1, cell 175 is configured to present the data therein as a single value (e.g., "56.05").

In some instances, the data content of cell 180, as well as the other cells in table-based visualization table 150, may be configured to represent the data content therein as a chart or other types of visualization representations. Aspects of the present disclosure include mechanisms for defining the configuration(s) and visualization representation(s) of data content in the table-based visualizations herein.

In some embodiments, a table-based visualization may be realized by a combination of defining a row scope and defining the specific configurations of the components of the table-based visualization. FIG. 2 is an illustrative depiction of a process 200, in accordance with some embodiments herein. Process 200 includes an operation 205 to define a row scope for a table-based visualization of the multidimensional data set, where the row scope specifies a number of dimensions of the multidimensional data set. The multidimensional data set referenced by operation 205 should be defined prior to operation 205. In this manner, the data content visualized in a table-based visualization can be an accurate reflection of a stable data source.

Process 200 further includes, at operation 210, selectively defining at least one data selection of the multidimensional data set to connect to the row scope defined in operation 205. Operation 210 provides a mechanism to specify all of the columns of a table-based visualization separately and to specify the result set(s) to be used for the visualization of data content for the particular (i.e., concrete or actual) columns. The present disclosure includes numerous and various methods and techniques for specifying the data content as a variety of types of visualization representations, in an efficient, flexible, and intuitive manner.

In some embodiments, operation 205 includes configuring an initial table-based visualization. The configuring of an initial table-based visualization may be implemented via a system, application, or service where the addition of columns may be done by a manual operation and/or an automated process. A manual configuration process may allow a user to specify or define columns of the table-based visualization column by column.

In the event the configuration process is at least partially automated, the process may observe some of the following conditions. In some embodiments, for every dimension included in the rows scope, there is one column with dimension members; for the first measure there is one dimension displaying the measure sum of the row scope definition; and for the first dimension that is outside of the row scope there is a column with a trend chart displaying the measure members for those dimension as line or column chart. In some embodiments, the automated process may make a number of assumptions regarding the multidimensional data set, such as all dimensions have activated result members. Accordingly, a need may exist to verify the generated columns in certain situations.

Figure 3:
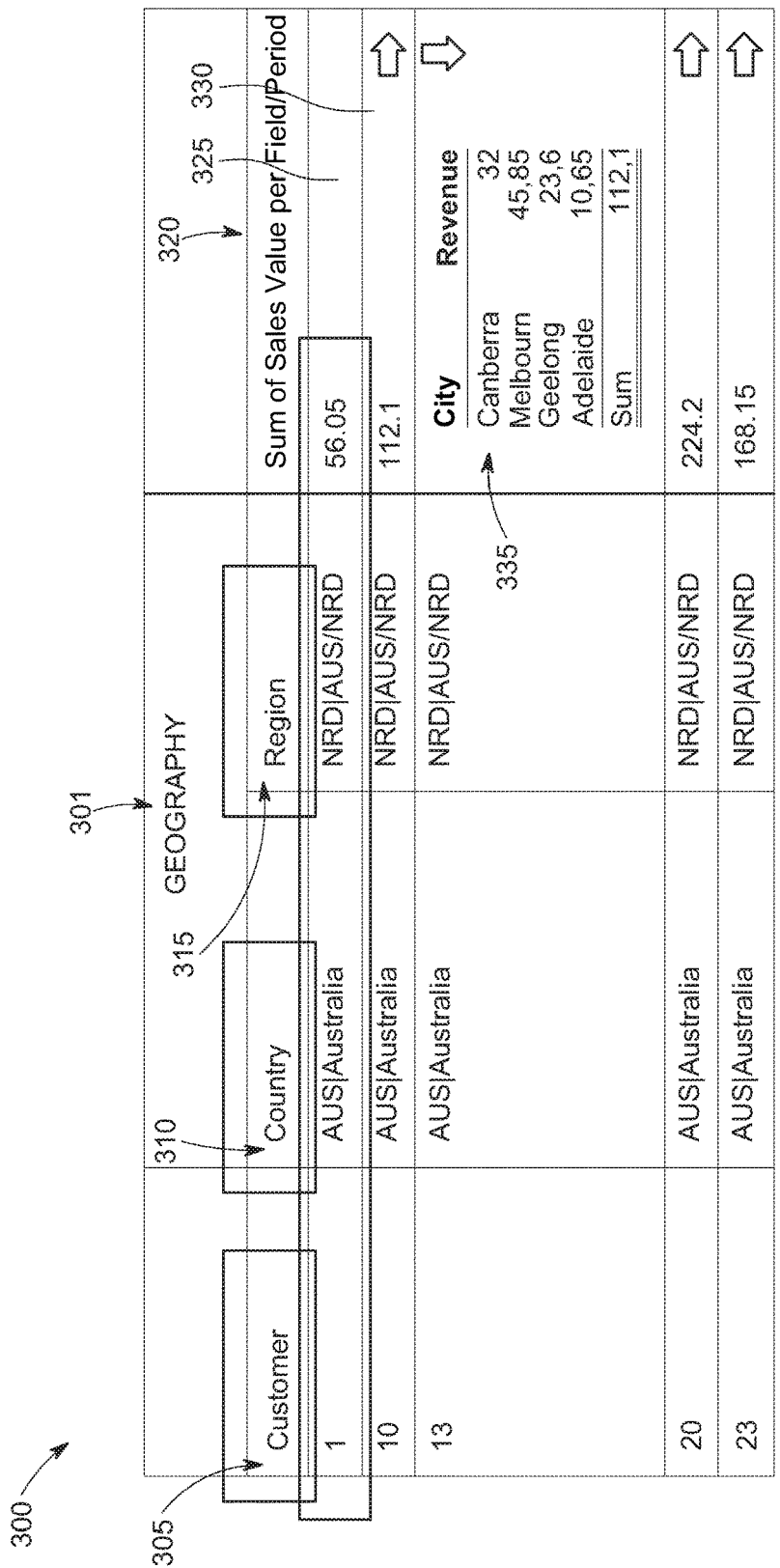
FIG. 3 is an illustrative depiction of a table-based visualization including a chart visualization in a cell, in accordance with some embodiments herein.

The aspect of operation 210 including specifying the result set(s) to be used for the visualization of data content for the particular (i.e., concrete or actual) columns may be referred to herein as configuring the table-based visualization. As a general overview, a table-based visualization herein may be divided into a number of areas including, group headers, columns, column headers, and column content. FIG. 3 is a portion of a table-based visualization 300 to illustrate the various areas of a table-based visualization, in some embodiments herein. Group Headers allow grouping of columns in custom groups that can be used for special descriptions. In FIG. 3, a group header "Geography" at 301 encompasses "Country" column 310 and "Region" column 315. Columns provide a mechanism to visualize a result set based on chosen selections and visualizations. Columns in FIG. 3 include columns 305, 310, 315, and 320 that are defined by their header and content. Table-based visualization 300 further includes column headers that include a description of the column. Referring to FIG. 3, column 305 has a column header "Customer", column 310 has a column header of "Country", column 315 has a header of "Region", etc. The term column content herein refers to the data content visualized in each row based on the Row Scope definition and chosen visualization. Examples of the column content or data content is shown in column 320 (i.e., "Sum of Sales Value per Field/Period") including the textual values listed at, for example, 325 and 330; and the visualization of a chart shown at 335. Dimension "City" visible in the example in the chart 335 is a dimension which is available in the multidimensional data set, but not used in the specified row scope.

In some embodiments, a configuration of columns herein may be facilitated by a mechanism to add a new column after a last existing column, insert a new column before a selected column, deletion of an existing column, copying of an existing column and pasting/inserting of it into a desired location, and rearranging an order of existing columns. In some embodiments, a configuration of column headers herein may be facilitated by a mechanism to group two or more group headers together and a mechanism to ungroup a previously grouped header. These and other mechanisms may be included in some embodiments to facilitate and support the configuration of table-based visualizations herein. The flexible definition of selections for row scope and other content in the table allow free reorganization of all columns, placement of chart-content columns before the row scope columns. The selections are independent of the content placement in the underlying data source.

Returning to FIG. 2, upon a completion of operation 210 the process 200 proceeds to operation 215. At operation 215 an instance of the table-based visualization may be generated based on the defined row scope and the defined at least one data selection. The visualization may be displayed on a display device in a format consumable by a user. The visualization may also be stored in a record for later consumption by a user or user device.

Once an initial table-based visualization configuration is specified (i.e., generated), the configuration settings to be used for the visualization of data content for the particular (i.e., concrete or actual) columns can be performed. In some embodiments, some properties of the table-based visualization may be specified by global settings. In some embodiments, global settings may include, for example, heights for a group header, a header and rows; interaction behavior(s); and navigation behavior(s). Additional properties can be used to further define and customize the columns.

In some embodiments, a width of a column in a table-based visualization may be specified manually or automatically sized. Columns that are marked as "Auto Size" (or the like) may be resized (e.g., reduced or enlarged) to an extent of the available free area in proportion to its width. In some instances, a column may be "hidden"—in which case the system does not select data required for the visualizations which are in hidden columns.

For configuring a table-based visualization's header and group header, a header can be bound or connected to a column by selecting a column (by any means) for the header. In some embodiments, a header may be designated as hidden in the case multiple columns are to be merged and shown with a single group header description.

In some aspects, a key aspect of the present disclosure is the flexibility and extent to which the visualizations of the data content of data in cells of a table-based visualization herein can be specified and customized. The particular implementations for executing the "data selections" herein may vary in their particulars depending, at least in part, on a system, device, service, or application's implementation thereof but the functionality disclosed herein can be a constant.

The primary content of a table-based visualization in some embodiments may be arranged in the columns of the table-based visualization. In general, a column includes four parts, including the column content, column cell layout, column header layout, and column properties. Column content may be dependent on the type of content set for the column. The type of content may be set according to a column template. In some embodiments, a column template may specify the data content will be represented as a single selection of content (e.g., a display of values, images, or texts), a comparison chart (e.g., bar chart, bullet chart, delta bar chart, fraction bar chart, etc.) for comparing two single selections, and a tend chart (e.g., a line chart, a bubble chart, etc.) for listing multiple cells.

In some embodiments, one or more properties that may apply to every column type can be set manually. The properties may apply the same value to all rows or the properties may bound or connected to a particular selection and evaluated for each row individually.

In a table-based visualization herein, a cell is independent if it is a header, group header or content cell. A cell may have one or more properties for layout and design thereof. Text properties are may be available only for cells that support text therein. In some embodiments, the text area can be defined regarding a font name, size, color and other settings. In some embodiments, layout properties for a cell including, for example, borders, padding, colors, background settings, etc. may be specified by a user or application.

In some embodiments, properties regarding headers, group headers, and columns may be set for all headers, group headers, and columns, respectively or individually. In some embodiments, some properties may be set to a default value.

Regarding the configuring of textual content in a table-based visualization herein, a template for textual content settings can be used to display members from dimensions, attributes and the data from selected measures. Such a template or other mechanism to receive user inputs to specify settings may allow for the specification of properties for the textual content and may, in some instances, be used to activate icons, images, and other visualization representations. In some embodiments, any content may be selected to display as "text" in a cell.

Regarding configuring trend charts in a table-based visualization herein, trend charts such as column, line, and bubble charts, can be used to visualize data series from dimensions that are not included in the row scope definition. A column chart can be used when a (small) number of data points are to be represented in a visualization with only one axis. A line chart can be used when a (larger) number of data points are to be presented in a visualization and only one axis is involved. In some embodiments, target data points may be visualized by a dotted line in a line chart. A bubble chart herein can be used when, for example, comparing a distribution of data in more than one axis (e.g., two or three). For example, a bubble chart can display the actual data in Y axis, the target data in the X axis and can visualize additional data in a Z axis as bubble size.

Regarding comparison charts (e.g., bar, bullet, delta bar, and fraction pie charts) in a table-based visualization herein, comparison charts may be used to visualize data content to visualize some data in comparison to other data. For example, a bar chart may be prepared for a single value display and a bullet chart may be used to display two values (e.g., actual and target) with a third value in the background (e.g., forecast). In some embodiments, a number of threshold values (e.g., 5) may be defined for a bar chart. A delta bar chart can be prepared for comparison of a delta value between two values and a fraction pie type of comparison chart may be prepared to compare a fraction as a percentage of a pie representation of a value.

Figure 4:
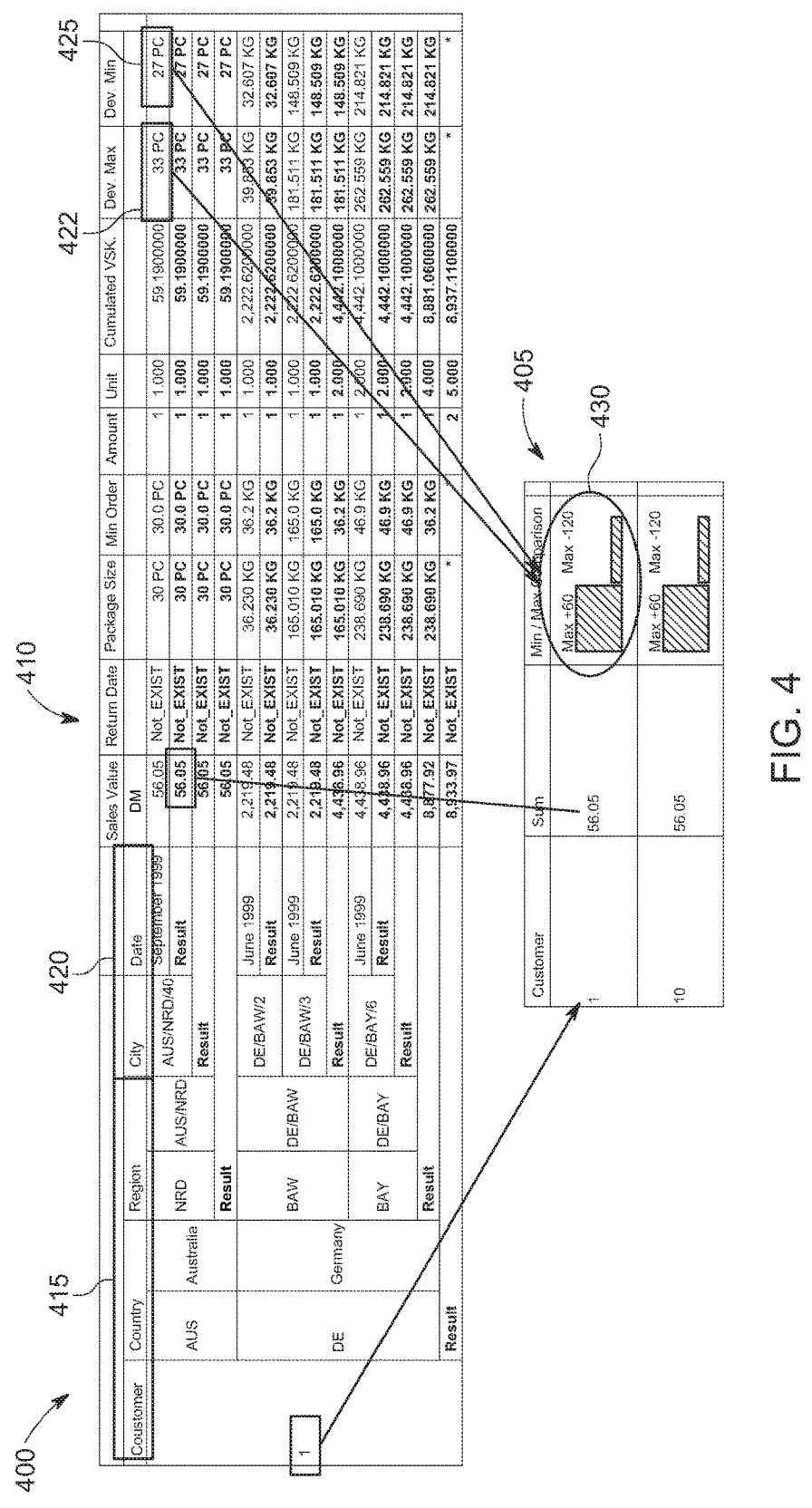

FIG. 4 is an illustrative depiction 400 showing a selection of data to visualize data content in a chart in a table based visualization 405, in accordance with some embodiments herein. Table based visualization 405 is based on a multi-dimensional data set represented by data source table 410. Similar to FIG. 1, the Row Scope for table based visualization 405 is shown in box 415, meaning the dimensions in box 420 are available for detailed selection. In the example of FIG. 4, data values 422 and 425 are selected and visually presented in a comparison chart at 430. As shown, the data content in the table based visualization 405 is presented in a more concise and visually effective manner than it is in table 410.

Figure 5:
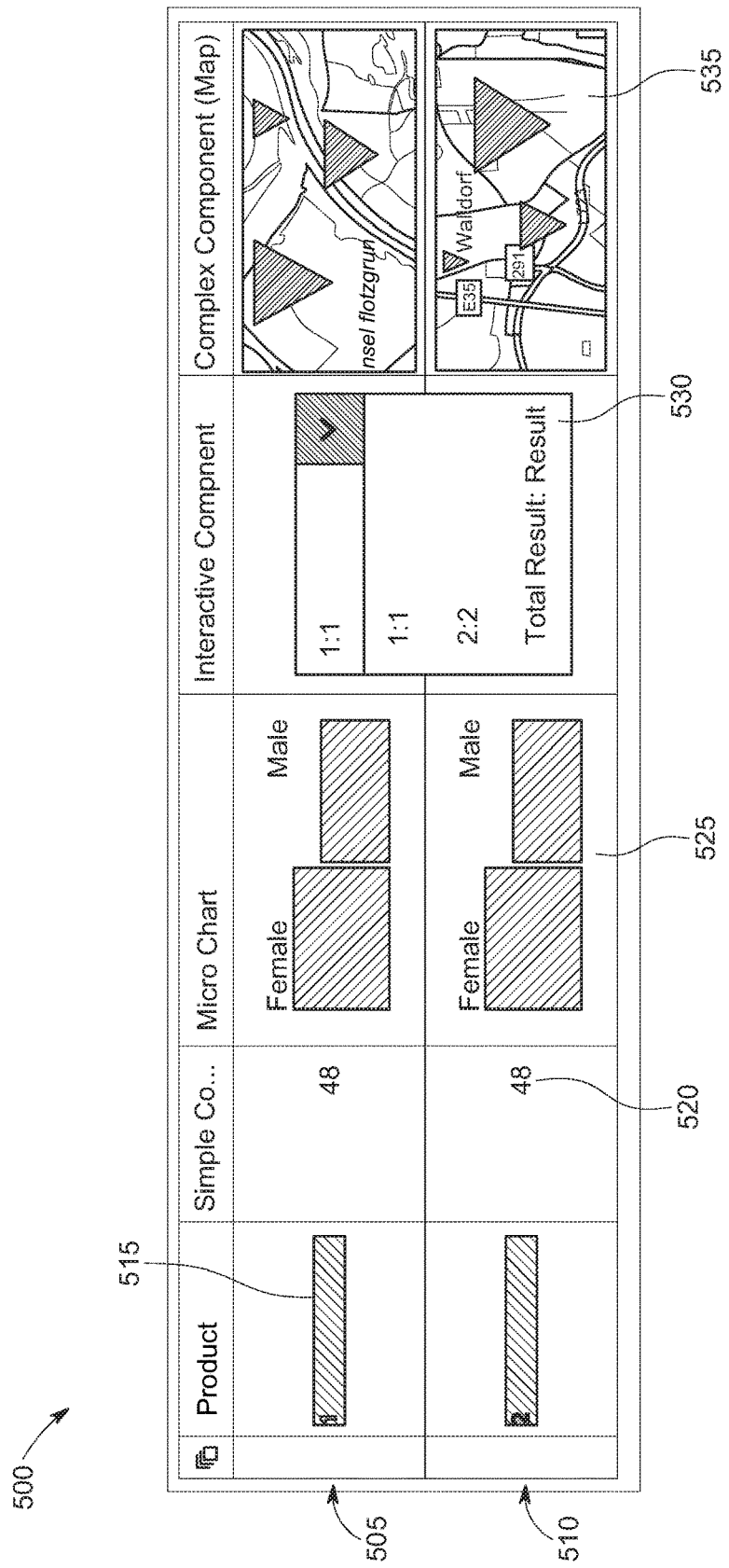
FIG. 5 is an illustrative depiction of a table-based visualization including data content represented in a variety of different visualizations, in accordance with some embodiments herein.

FIG. 5 is an example of a table-based visualization 500, showing data content presented as different types of visualizations, in accordance with some embodiments herein. Visualization 500 is a sampling of a table based visualization and includes two rows at 505 and 510. The displayed row selection is bound or connected to the result set of the table based visualization. In some aspects, the result set can be filtered so that less than all of the result set is presented in the table based visualization 500. The filtering is possible by specification of inclusion or exclusion of some dimension members from the dimension(s) used in the row scope definition. (more slides for details on the selection model) In the example of FIG. 5, the content for column 515 is a simple cell wherein a background color has been specifically specified for the single values in the cells of the column. The content in column 520 includes a single value selected from the data source, while the content of column 525 is a comparison chart visualization based on an additional dimension of gender (e.g., Male and Female). Column 530 shows an interactive component that is based on a selection of data from the data source. The interactive component of the example of FIG. 5 includes values presented in a drop-down menu, where a user can interact with the component to reveal further details of the content. In some embodiments, interactive content in a cell of a table-based visualization can be at least one of an interactive control to invoke an internal action in reply to a user input (e.g., cause an action in an application or system including a table-based visualization application or functionality), an interactive control to invoke an external action in reply to a user input (e.g., open a link, and at least one other interactive content.

In column 535 of FIG. 5, a visualization of data content is presented in a geo-spatial map, where an icon on the map represents location coordinates and the size of the icon represents a relative size of some measure (e.g., sales volume).

As shown, the data presented in table-based visualizations in accordance with embodiments herein can be represented in a variety of different types of visualizations, even within a same table based visualization.

Figure 6:
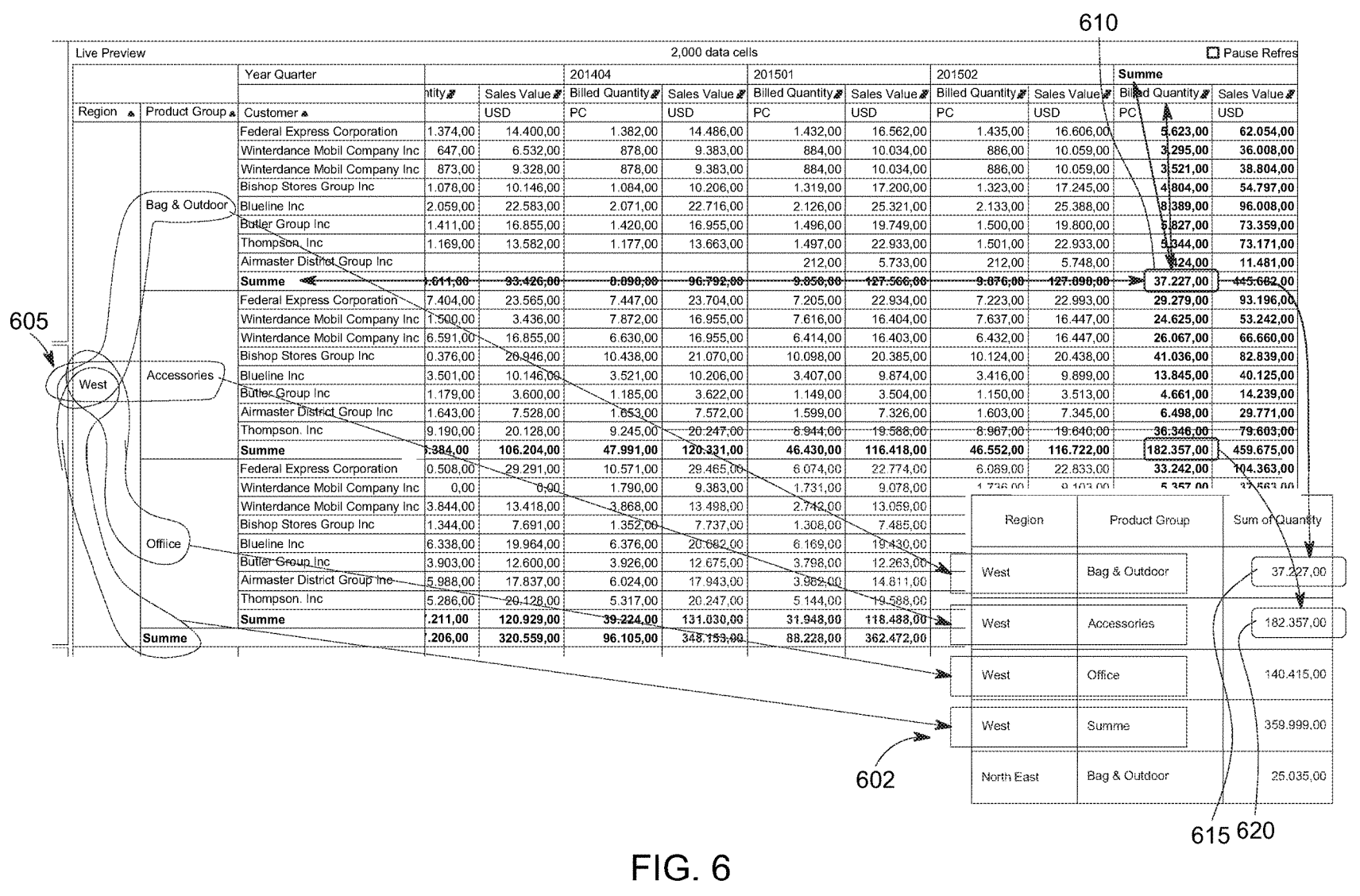

FIG. 6 is another depiction of a data selection method to realize a table based visualization, in accordance with some embodiments herein. For example, dimensions can be selected and combined to define a Row Scope at 605 (e.g., Region+Product Group). The Row Scope is reflected in the rows of the table-based visualization 602 where the rows include the combination of dimensions defined by the Row Scope. At 610 the sum of the billed quantity is selected for inclusion in the table-based visualization 602. The corresponding values related to the selected members are shown at 615 and 620 and are presented as single values. In one aspect, a cell in table-based visualization 602 is addressed by the exact members of all dimensions that are available in the result set.

Figure 7:
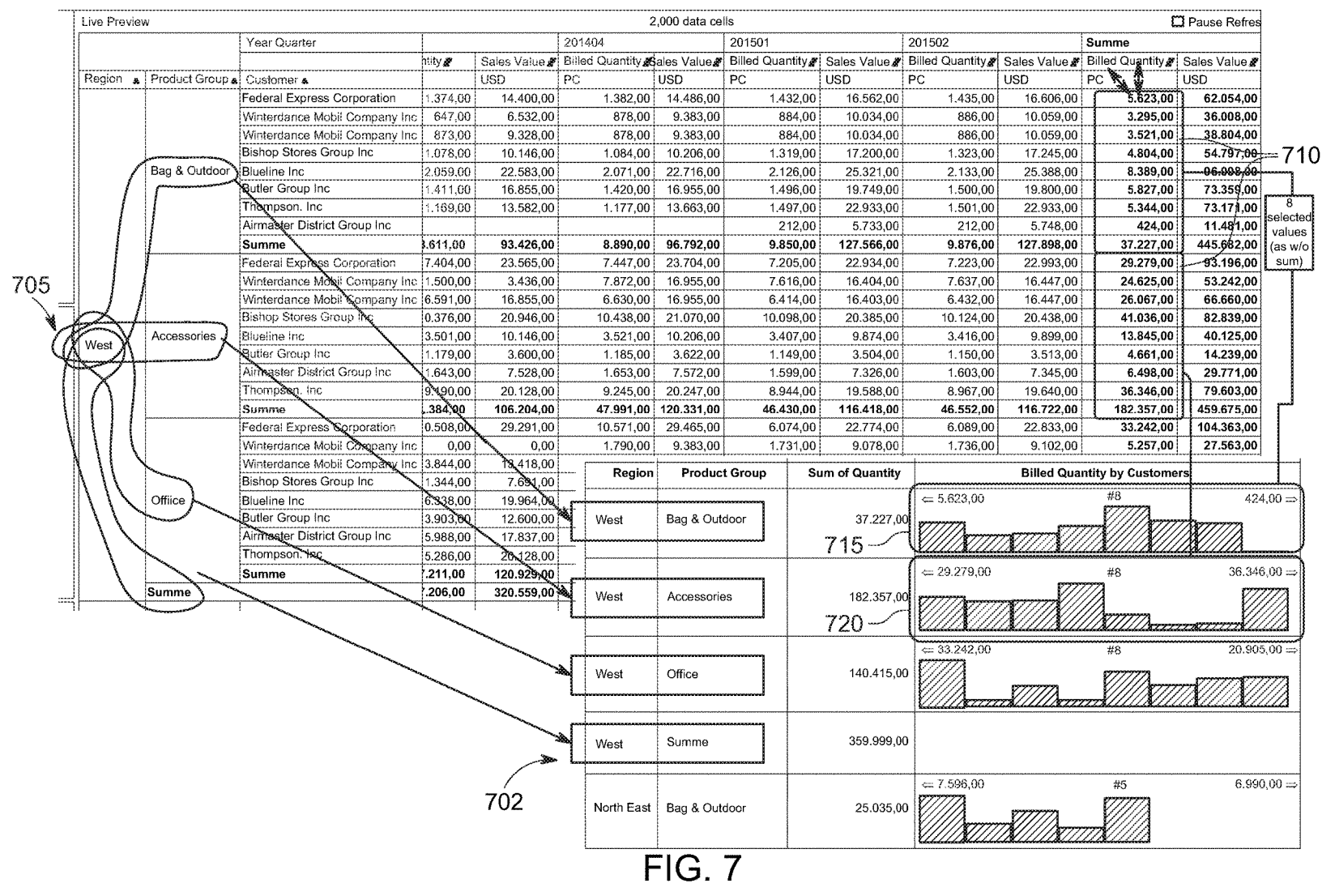

FIG. 7 is a depiction of a data selection method to realize a table-based visualization, in accordance with some embodiments herein. Dimensions are selected and combined to define a Row Scope at 705 (e.g., Region+Product Group). The Row Scope is reflected in the rows of the table based visualization 702 where the rows include the combination of dimensions defined by the Row Scope and some of the visualized data content is presented in bar graphs. At 710, multiple cells are selected. The multiple cells are addressed by pointing to concrete members of all the dimensions minus one. The one dimension that is not selected will deliver all members into the selection. In the example of FIG. 7, the Customer dimension is not used in the selection specification and therefore all of its values will be selected. The eight values selected at 710 (8 selected values, excluding the sum) are transformed into a bar graph representation at 715 and included in the table based visualization at 720.

Figure 8:
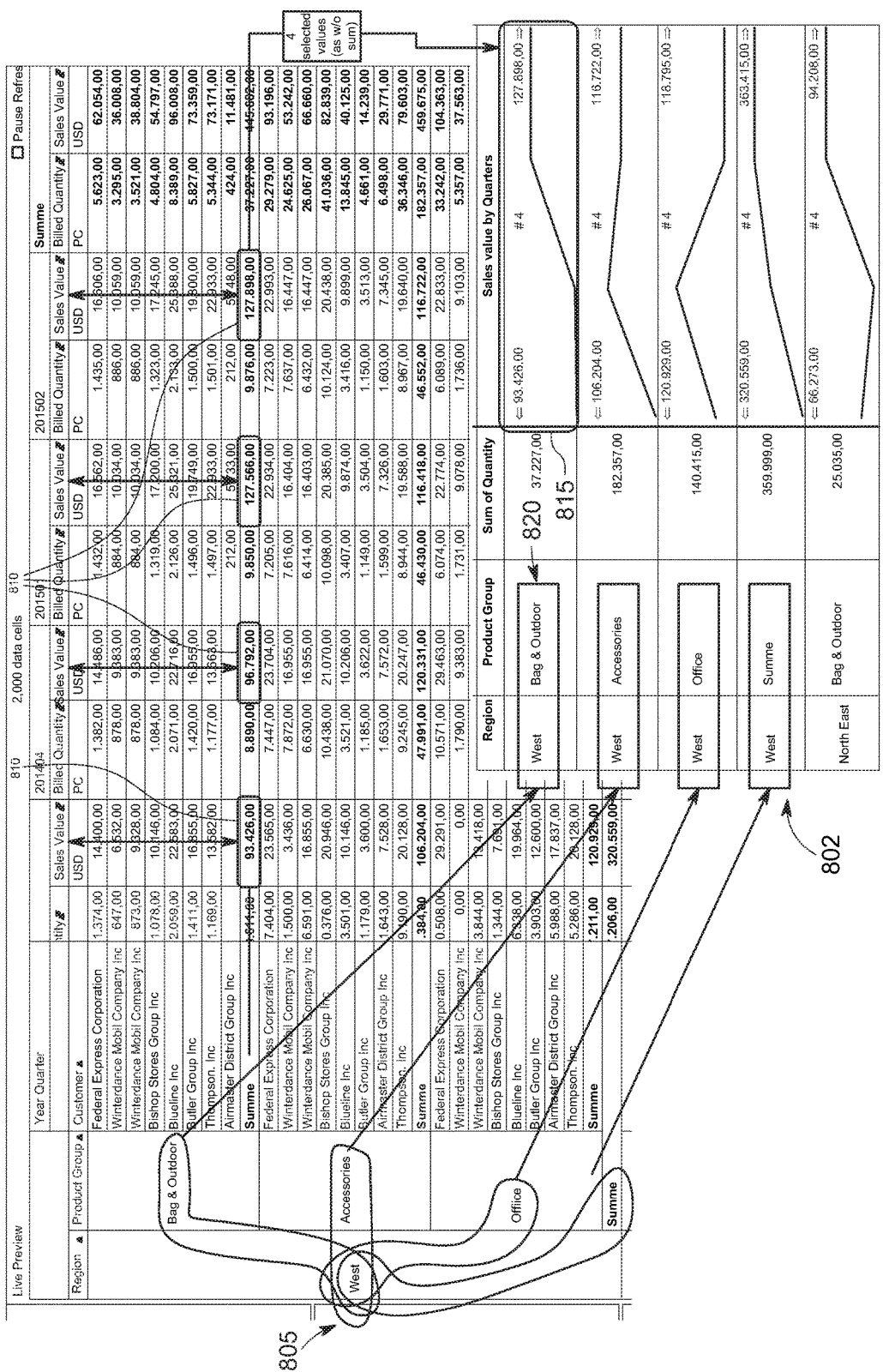
FIG. 8 is an illustrative depiction of a selection process to select and define content selection for a table-based visualization, in accordance with some embodiments herein.

FIG. 8 is a depiction of a data selection method to realize a table-based visualization, in accordance with some embodiments herein. Dimensions are selected and combined to define a Row Scope at 805 (e.g., Region+Product Group) similar to FIG. 7. The Row Scope is reflected in the rows of the table based visualization 802 where the rows include the combination of dimensions defined by the Row Scope and some of the visualized data content is presented in line graphs. At 810, multiple cells, 4, are selected. The multiple cells are selected from columns (i.e., dimensions). In the example of FIG. 8, the one dimension that is not selected is the Year Quarter dimension, thus all values will be selected. The four values selected at 810 are transformed into a line chart representation at 815 and included in the table-based visualization at 820.

As demonstrated by the various descriptions and table based visualization examples herein, a data selection of a multidimensional data set can include selecting data including at least one of a single value, multiple values, an array of values, a list of arrays, a function of data values of the multidimensional data set, and combinations thereof. In some embodiments, a custom visualization can present content with at least one of the following features: a size of a table-based visualization cell depends on the content therein, a visualization of the content depends on a display size of a device to render the visualization, a visualization of the content depends on a characteristic of a post-analysis result of selected content, a visualization of the content is presented on a geographical map, a visualization of the content is selectively determined by a user during a runtime, a type of visualization of the content is selectively determined in response to a user specified selection during a runtime, a visualization of the content is specified during a design time, and a type of visualization of the content is selectively determined in response to a user specified selection during a runtime. Other aspects of a data visualization may be defined in accordance with the embodiments and descriptions herein, alone and in combination.

In some embodiments, a visualization table herein may have different types of visualization content in every column. The visualizations may be based on "visualization templates" that can be predefined and specify values for various properties of the visualizations. The visualizations may be predefined by a developer or other entity supplying the visualizations. In some embodiments, an ability to modify or establish at least some of the properties of the visualizations may be extended to a customer and/or partner of the supplier of the visualization table(s), application, or service. A visualization template (also simply referred to as a "template") can have one or more properties that specify values for different parameters of a visualization. The properties can relate to selections (e.g., a single cell, a list of cells, or both), user interface (UI) properties (e.g., background, colors, sizes, etc.), and other aspects of visualizations. The properties may be handled by a supporting framework in a generic or common manner and a developer (or other entity) of the visualization template(s) can specify the different properties and their behavior.

Figure 9:
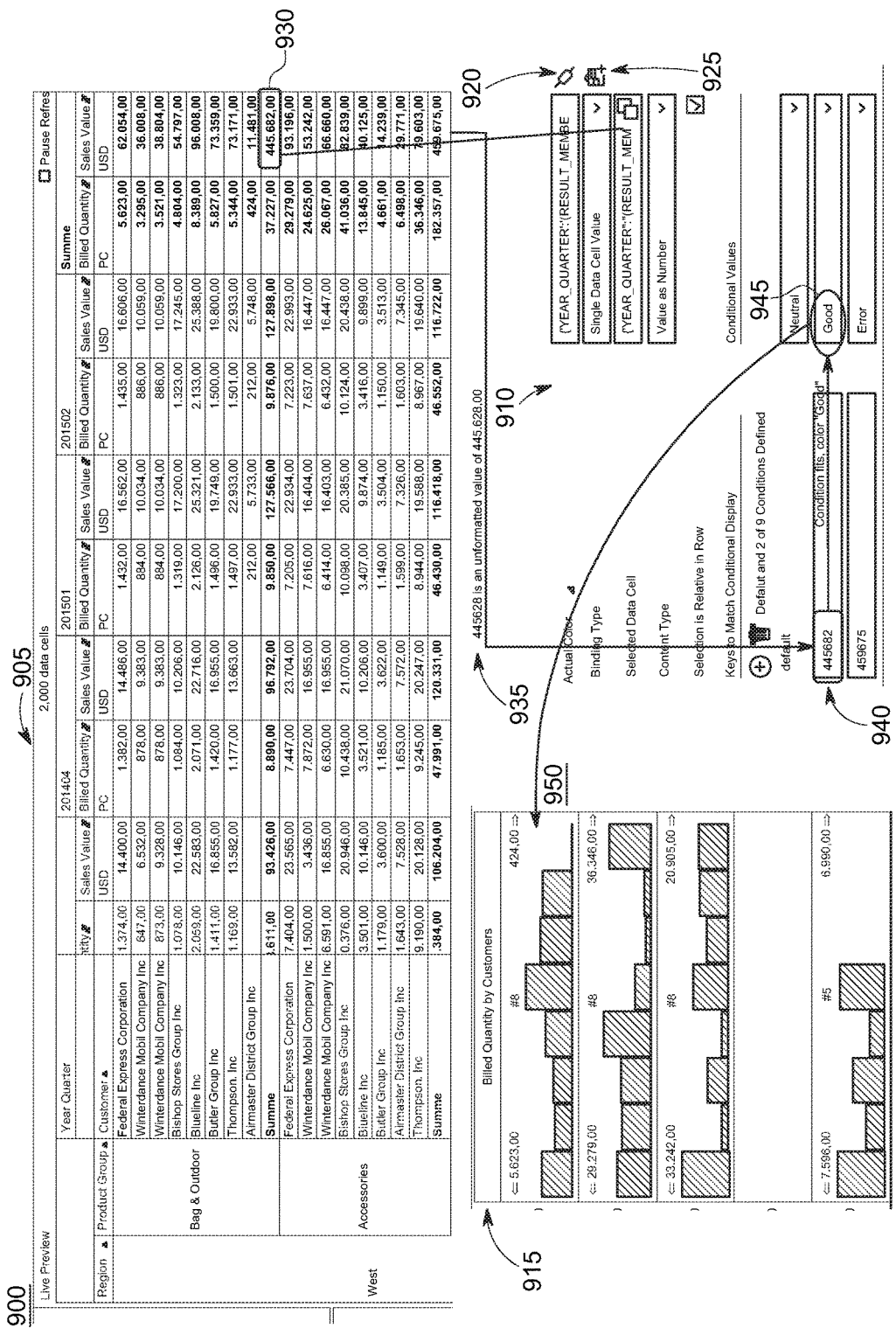
FIG. 9 is an illustrative depiction of a selection process to specify properties of a visualization, in accordance with some embodiments herein.

FIG. 9 is an illustrative depiction of a data selection method 900 to specify properties of a visualization, in accordance with some embodiments herein. FIG. 9 includes an example of a tabular representation of a multidimensional data source 905 and details of a data selection method including a work area 910 to specify at least some properties of a visualization 915 of a visualization table. As shown in work area 910, a number of properties for the visualization 915 can be selectively specified by, for example, a developer. Some examples of possible properties include a "Binding Type", a "Selected Data Cell", a Content Type", a "Selection is Relative in Row" and a "Key to Match Conditional Display", although additional, fewer, and alternative properties can be defined for some visualizations. In some embodiments, a property may be bound or connected to the data source, where the bound value(s) are used directly as the property value. In some embodiments, there can be an indirect binding where the bound value is translated to a representative property value (e.g., color, size, icon, etc.).

As indicated at 920 in FIG. 9, the "Selected Data Cell" property is "bound" or connected to data source value at 930. Additionally, this same property is also "conditional", as indicated by the icon at 925. The data source value at 930 is entered into the work area in, for example, an unformatted format as indicated at 935. At 940, specifics for the conditional aspects of the bound property are defined. For example, the value for the data source value from 930 is defined as being an acceptable fit and as such, the color for the visualization is specified to be the "Good" color at 945 (e.g., green for "Good", red for a value that indicates an "Error", and grey for a "Neutral" value). Once specified, visualization 915 can be generated, wherein the visualization will include a representation 950 of the value for the bound property as specified at 910.

Figure 10:
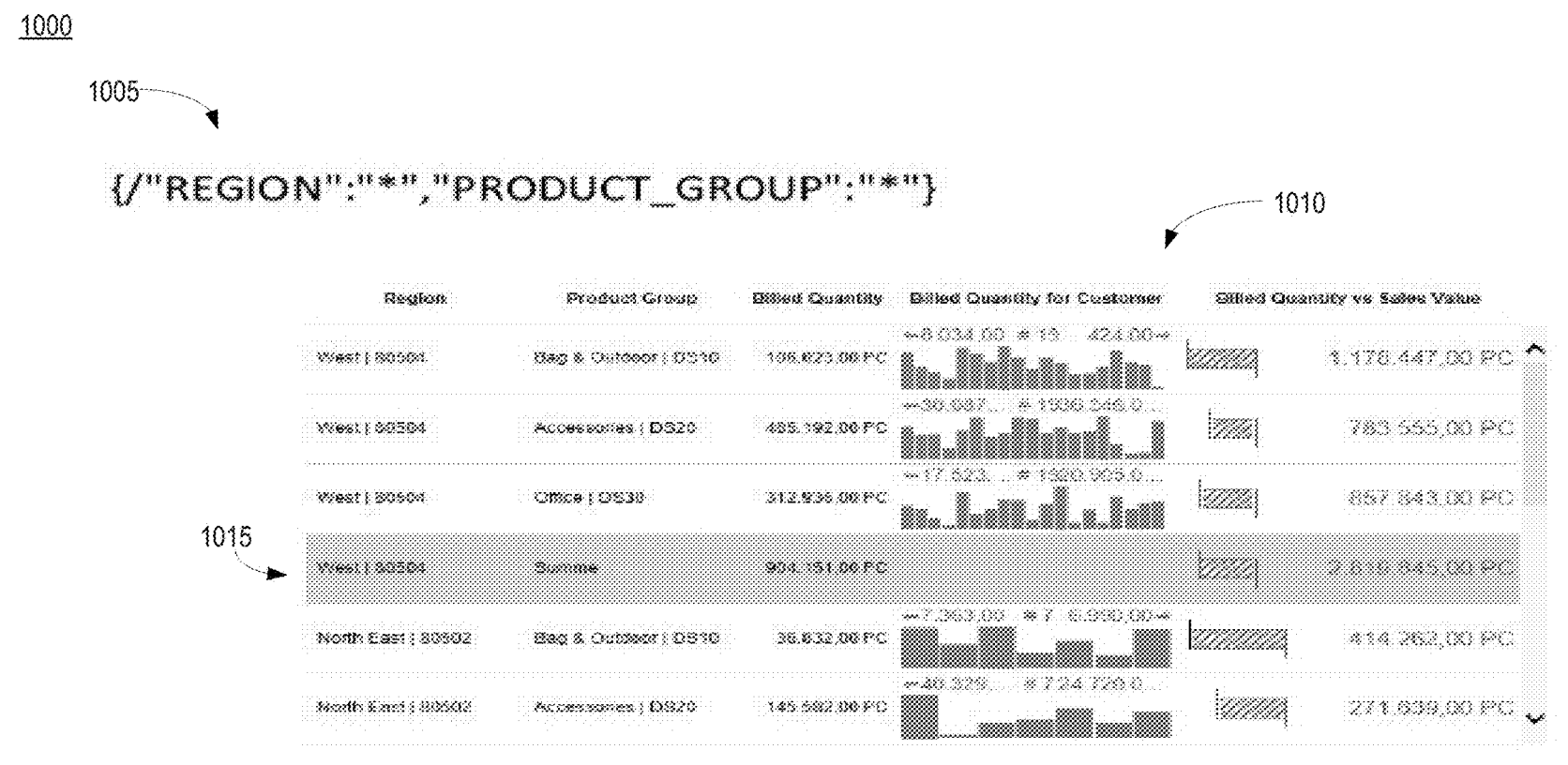

FIG. 10 is an illustrative depiction of a data selection method 1000 to specify a Row Scope with a filter, in accordance with some embodiments herein. FIG. 10 includes an example of an input 1005 to a system to define the Row Scope with a filter. The specified Row Scope is specified as including all members from 2 dimensions (i.e., "Region" and "Product Group") It is noted that the particular syntax of the example entries herein are for illustrative purposes and other specification and encoding formats can be used without any loss of generality. An illustrative visualization table 1010 is shown, including a visualization 1015 as specified by input 1005.

Figure 11:
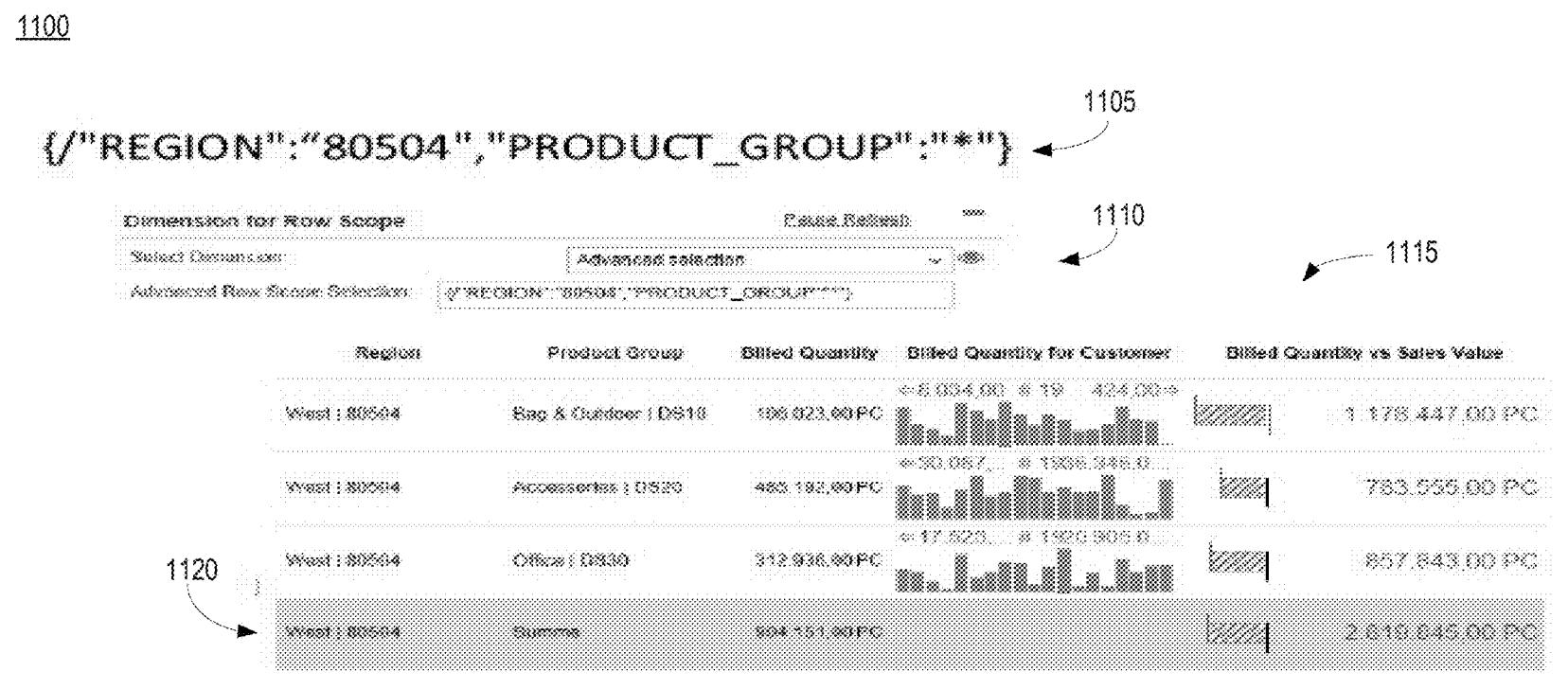

FIG. 11 is an illustrative depiction of a data selection method 1100 to specify a Row Scope with a filter, in accordance with some embodiments herein. FIG. 11 includes an example of an input 1105 to a system to define the Row Scope with a filter. The specified Row Scope is defined as including one member from a first dimension (i.e., only the "West" Region) and all members from a second dimension (i.e., "Product Group") It is noted that the particular syntax of the example entries 1110 of FIG. 11 are for illustrative purposes and other specification and encoding formats can be used. An illustrative visualization table 1115 is shown, including a visualization 1120 as specified by input 1105.

Figure 12:
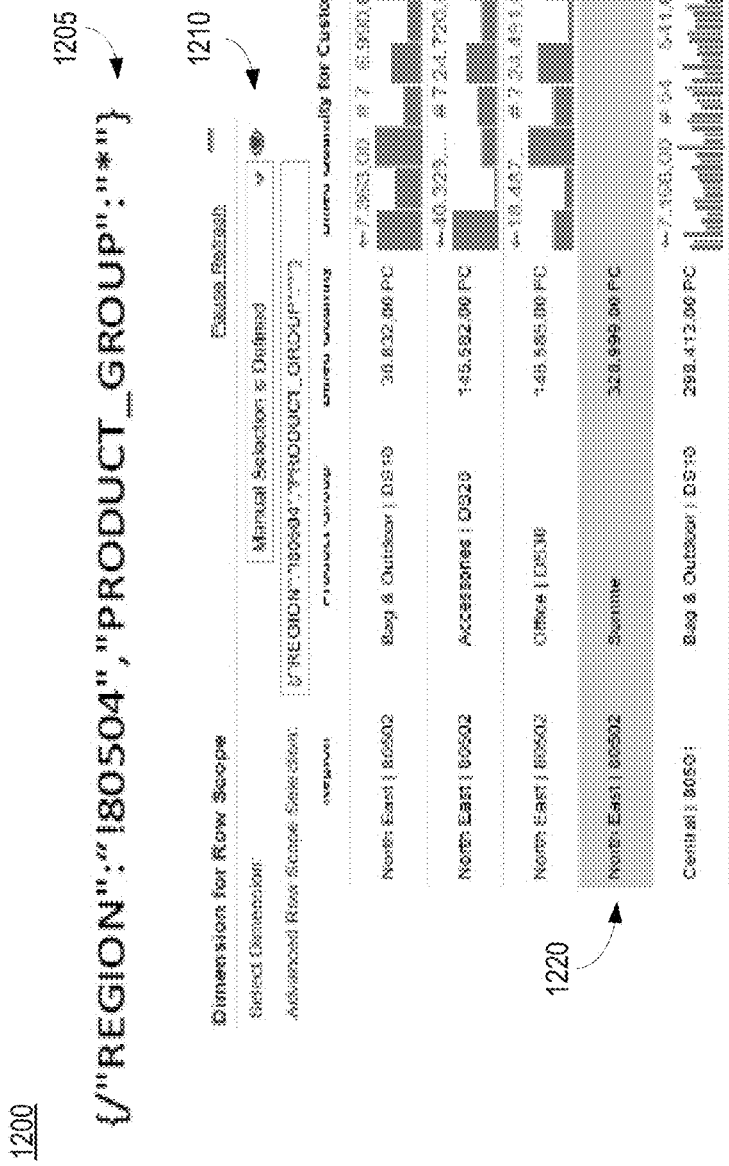
FIG. 12 is yet another illustrative depiction of a selection process to specify a row scope with a filter, in accordance with some embodiments herein.

FIG. 12 is another illustrative depiction of a data selection method, now referenced as 1200 to specify a Row Scope with a filter, in accordance with some embodiments herein. FIG. 12 includes an example of an input 1205 to a system to define a Row Scope with a filter. The specified Row Scope is defined as including all members except one of a first dimension (i.e., all members of "Region", excluding "West" where "80504" is the technical key for "West") and all members from a second dimension (i.e., "Product Group"). It is noted that the particular syntax of the example entries 1210 of FIG. 12 are for illustrative purposes and other specification and encoding formats can be used. An illustrative visualization table 1215 is shown, including a visualization 1220 as specified, in part, by input 1205. In the example of FIG. 12, the Result stats are directly bound with "North East" as shown at 1220.

Figure 13:
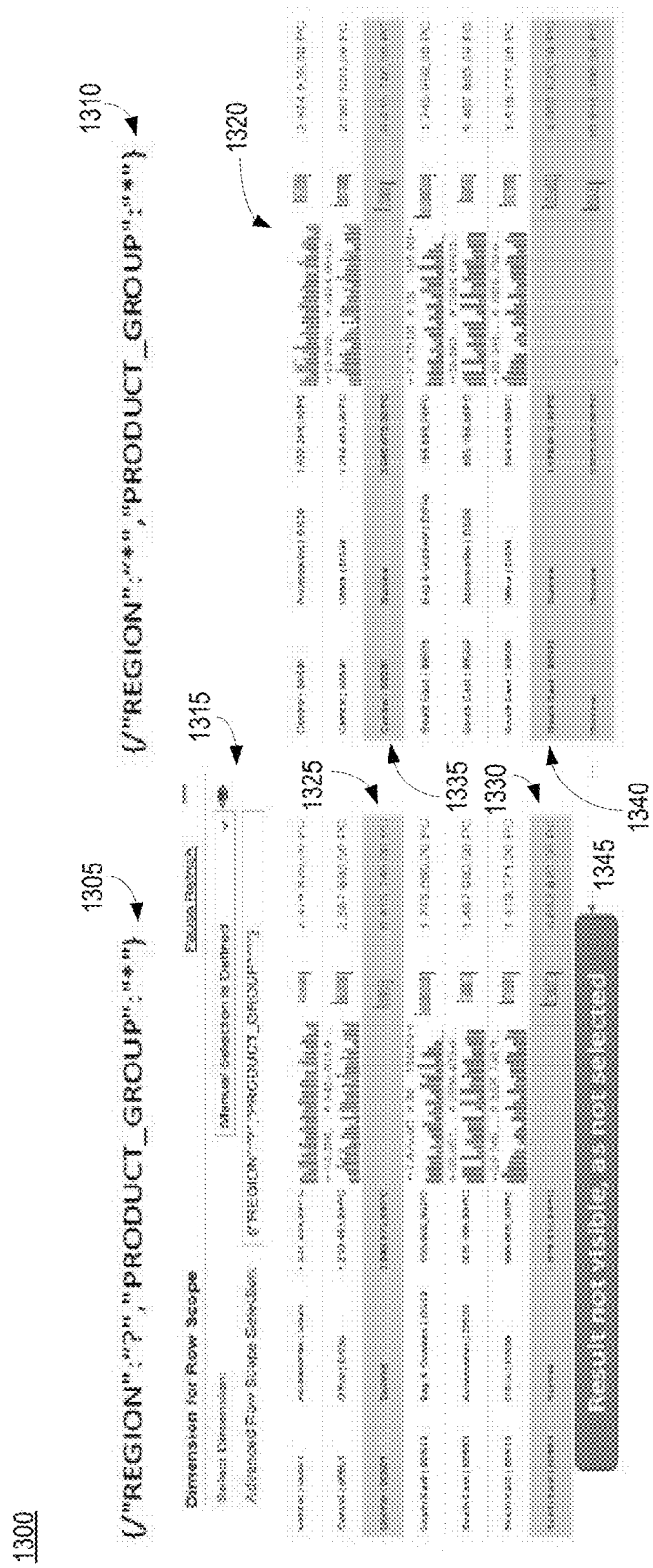
FIG. 13 is still another illustrative depiction of a selection process to specify a row scope with a filter, in accordance with some embodiments herein.

FIG. 13 is an illustrative depiction of a data selection method 1300 to specify a Row Scope with a specific filter, in accordance with some embodiments herein. FIG. 13 includes an example of an input 1305 to a system to define the Row Scope with a filter. The filtered selection of the Row Scope is defined as including all members of "Region", excluding result members and all members from the "Product Group" dimension. The particular syntax of the example entries 1315 in FIG. 13 is for illustrative purposes and other specification and encoding formats can be used. An illustrative visualization table 1320 is shown, including visualization 1320 as specified by input 1305. The visualizations 1325, 1330 are further defined to include a comparison (i.e., specification at 1305) and the comparison values (i.e., specification at 1310) to complete the selection are shown on the right at 1335, 1340. As defined, no result is shown on the left at 1345, as specified/selected.

FIG. 14 is an illustrative depiction and explanation of a selection example 1400 defining features of a visualization including a single value. A selection opening is represented by "{" at 1405. A first dimension selection is stated at 1410 and its measure selection is shown at 1415, while a second dimension selection is stated at 1420 and its content type is specified at 1425. The selection closing is represented by "}" at 1430.

FIG. 15 is an illustrative depiction and explanation of a selection example 1500 defining metadata for a visualization. A selection opening is represented by "{" at 1505 and the closing is shown at 1535. The selection is defined as being from dimensions at 1510, including the "Measures" dimension 1515, and measures 1520 including the selected measure of "BILLED_QUANTITY" 1530 and having associated metadata "unitOfMeasure" 1530.

FIG. 16 is an illustrative depiction and explanation of a selection example 1600 defining features of a visualization including multiple cells. A selection opening is represented by "{" at 1605. A first dimension selection is stated at 1610 and its measure selection is shown at 1615, and a second dimension selection is stated at 1620 wherein all of its members are selected. The selection closing is represented by "}" at 1625.

Figure 17:
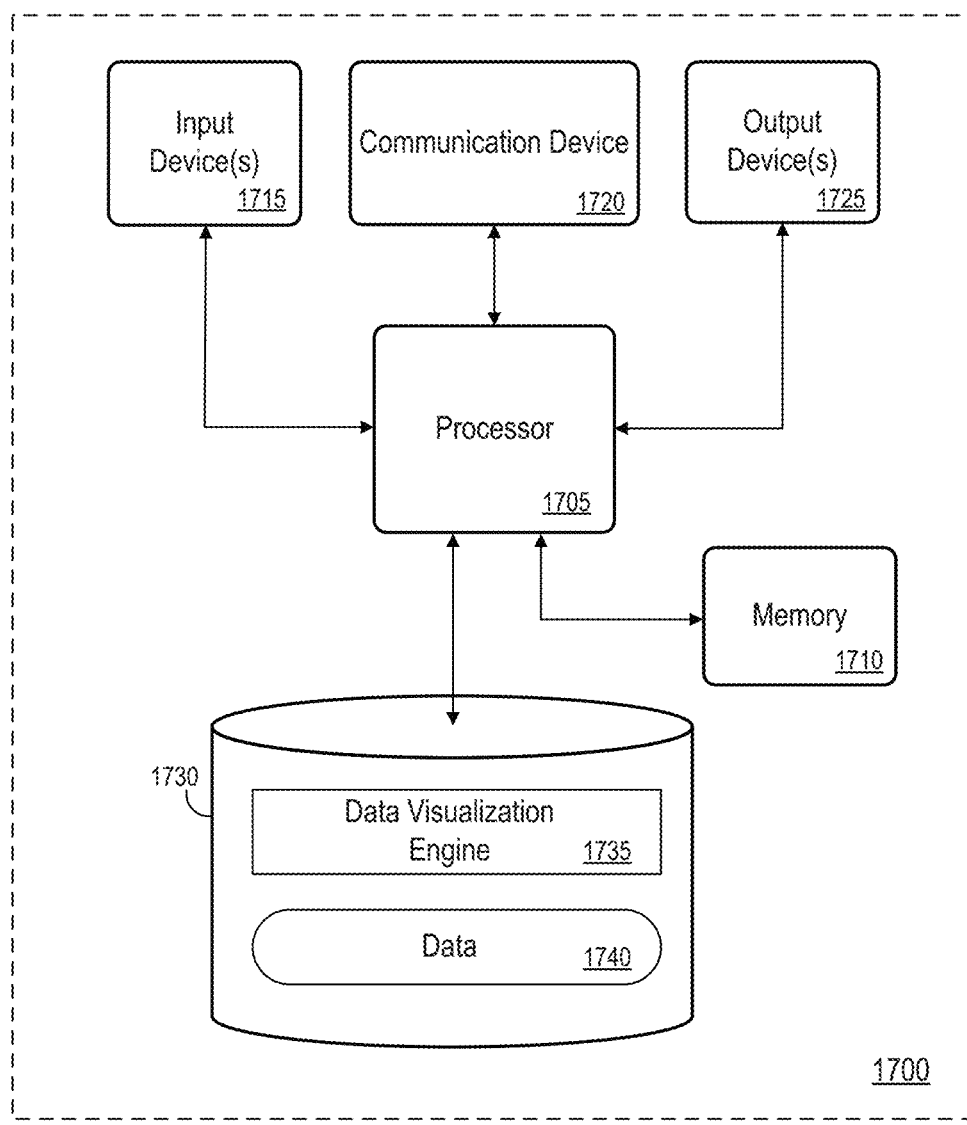
FIG. 17 is a block diagram of a system according to some embodiments.

FIG. 17 is a block diagram of a system or apparatus 1700 according to some embodiments. System 1700 may be, for example, associated with devices for implementing a platform and or processes disclosed herein. System 1700 comprises a processor 1705, such as one or more commercially available Central Processing Units (CPUs) in the form of one-chip microprocessors or a multi-core processor, coupled to a communication device 1720 configured to communicate via a communication network (not shown in FIG. 17) to another device or system. In the instance system 1700 comprises a device or system, communication device 1720 may provide a mechanism for system 1700 to interface with an entity (e.g., an application, device, system, or service). System 1700 may also include a cache 1710, such as RAM memory modules. The system may further include an input device 1715 (e.g., a touchscreen, mouse and/or keyboard to enter content) and an output device 1725 (e.g., a touchscreen, a computer monitor to display, a LCD display).

Processor 1705 communicates with a storage device 1730. Storage device 1730 may comprise any appropriate information storage device, including combinations of magnetic storage devices (e.g., a hard disk drive), optical storage devices, solid state drives, and/or semiconductor memory devices. In some embodiments, storage device 1730 may comprise a cache management engine, including in some configurations an in-memory database.

Storage device 1730 may store program code or instructions 1735 that may provide processor executable instructions for defining and configuring table-based visualizations (and other types) related to multidimensional data sets, in accordance with processes herein. Processor 1705 may perform the instructions of the program instructions for data visualization engine 1735 to thereby operate in accordance with any of the embodiments described herein. Program instructions 1735 may be stored in a compressed, uncompiled and/or encrypted format. Program instructions for data visualization engine 1735 may furthermore include other program elements, such as an operating system, a database management system, and/or device drivers used by the processor 1705 to interface with, for example, other systems, devices, and peripheral devices (not shown in FIG. 17). Storage device 1730 may also include data 1740. Data 1740 may be used by system 1700, in some aspects, in performing one or more of the processes herein, including individual processes, individual operations of those processes, and combinations of the individual processes and the individual process operations.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Aspects of the processes, systems, and services discussed hereinabove may be implemented through any tangible implementation of one or more of tangible software, firmware, hardware, and combinations thereof, including processor executable instructions embodied on one or more types of media and executable by apparatuses including processors.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method to visualize a multidimensional data set, the method comprising:

defining a row scope for a table-based visualization to be generated of the multidimensional data set, the row scope specifying a number of dimensions of the multidimensional data set;

selectively defining at least one data selection of a subset of the multidimensional data set to connect to the defined row scope to be represented in the table-based visualization as a graphical visualization, the defined at least one data selection of the subset of the multidimensional data set specifying columns of the table-based visualization and results sets to be used in the graphical visualization of data content for the specified columns; and generating an instance of the table-based visualization based on the defined row scope and the defined at least one data selection, a row in the table-based visualization having a scope of the dimensions defined by the defined row scope and dimensions excluded from the defined row scope being included in the graphical visualization in the table-based visualization, the generated instance of the table-based visualization being presented in a column of a table comprising a plurality of dimensions of the multidimensional data set.

2. The method of claim 1, wherein the defining of the row scope comprises selecting a subset of a total number of dimensions of the multidimensional data set to define a row of the table-based visualization.

3. The method of claim 2, wherein the defining of the row scope comprises selecting at least two dimensions of the multidimensional data set and combining the selected at least two dimensions of the multidimensional data set to define a row of the table-based visualization.

4. The method of claim 1, further comprising specifying parameters to define a visualization for the at least one data selection of the multidimensional data set to be represented as in a cell of a table-based visualization.

5. The method of claim 1, wherein the at least one data selection of the multidimensional data set comprises selecting data including at least one of a single value, multiple values, an array of values, a list of arrays, a function of data values of the multidimensional data set, and combinations thereof.

6. The method of claim 1, wherein the visualization includes a presentation of at least one of a single selection of textual content, a trend chart, a comparison chart, and a custom visualization.

7. The method of claim 6, wherein the textual content includes a representation of a single selection of a text, a value, and an image content; the trend charts include at least one representation of a bar chart, a bullet chart, a delta bar chart, and a fraction bar chart to compare two single data selections; and the trend charts include at least one representation of a line chart, a column chart, and a bubble chart to list a selection of multiple cells of data.

8. The method of claim 6, wherein the custom visualization presents content with at least one of the following features: a size of a table-based visualization cell depends on the content therein, a visualization of the content depends on a display size of a device to render the visualization, a visualization of the content depends on a characteristic of a post-analysis result of selected content, a visualization of the content is presented on a geographical map, a visualization of the content is selectively determined by a user during a runtime, a type of visualization of the content is selectively determined in response to a user specified selection during a runtime, a visualization of the content is specified during a design time, and a type of visualization of the content is selectively determined in response to a user specified selection during a runtime.

9. The method of claim 1, wherein the visualization includes a presentation of interactive content, wherein the interactive content is at least one of: an interactive control to invoke an internal action in reply to a user input, an interactive control to invoke an external action in reply to a user input, and at least one other interactive content.

10. A non-transitory computer-readable medium having processor-executable instructions stored thereon, the medium comprising:

instructions to define a row scope for a table-based visualization to be generated of the multidimensional data set, the row scope specifying a number of dimensions of the multidimensional data set;

instructions to selectively define at least one data selection of a subset of the multidimensional data set to connect to the defined row scope to be represented in the table-based visualization as a graphical visualization, the defined at least one data selection of the subset of the multidimensional data set specifying columns of the table-based visualization and results sets to be used in the graphical visualization of data content for the specified columns; and instructions to generate an instance of the table-based visualization based on the defined row scope and the defined at least one data selection, a row in the table-based visualization having a scope of the dimensions defined by the defined row scope and dimensions excluded from the defined row scope being included in the graphical visualization in the table-based visualization, the generated instance of the table-based visualization being presented in a column of a table comprising a plurality of dimensions of the multidimensional data set.

11. The medium of claim 10, wherein the defining of the row scope comprises selecting a subset of a total number of dimensions of the multidimensional data set to define a row of the table-based visualization.

12. The medium of claim 11, wherein the defining of the row scope comprises selecting at least two dimensions of the multidimensional data set and combining the selected at least two dimensions of the multidimensional data set to define a row of the table-based visualization.

13. The medium of claim 10, further comprising instructions to specify parameters to define a visualization for the at least one data selection of the multidimensional data set to be represented as in a cell of a table-based visualization.

14. The medium of claim 10, wherein the at least one data selection of the multidimensional data set comprises selecting data including at least one of a single value, multiple values, an array of values, a list of arrays, a function of data values of the multidimensional data set, and combinations thereof.

15. The medium of claim 10, wherein the visualization includes a presentation of at least one of a single selection of content, a textual trend chart, a comparison chart, and a custom visualization.

16. The medium of claim 15, wherein the textual content includes a representation of a single selection of a text, a value, and an image content; the trend charts include at least one representation of a bar chart, a bullet chart, a delta bar chart, and a fraction bar chart to compare two single data selections; and the trend charts include at least one representation of a line chart, a column chart, and a bubble chart to list a selection of multiple cells of data.

17. The medium of claim 15, wherein the custom visualization presents content with at least one of the following features: a size of a table-based visualization cell depends on the content therein, a visualization of the content depends on a display size of a device to render the visualization, a visualization of the content depends on a characteristic of a post-analysis result of selected content, a visualization of the content is presented on a geographical map, a visualization of the content is selectively determined by a user during a runtime, a type of visualization of the content is selectively determined in response to a user specified selection during a runtime, a visualization of the content is specified during a design time, and a type of visualization of the content is selectively determined in response to a user specified selection during a runtime.

18. The medium of claim 10, wherein the visualization includes a presentation of interactive content, wherein the interactive content is at least one of: an interactive control to invoke an internal action in reply to a user input, an interactive control to invoke an external action in reply to a user input, and at least one other interactive content.

* * * * *